(12) United States Patent
Tzikas et al.

(10) Patent No.: US 7,087,730 B2
(45) Date of Patent: Aug. 8, 2006

(54) FIBER-REACTIVE AZO DYES, THEIR PREPARATION AND THEIR USE

(75) Inventors: Athanassios Tzikas, Pratteln (CH); Bernhard Müller, Efringen-Kirchen (DE); Georg Roentgen, Freiburg (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 36 days.

(21) Appl. No.: 10/523,241

(22) PCT Filed: Jul. 15, 2003

(86) PCT No.: PCT/EP03/07636

§ 371 (c)(1),
(2), (4) Date: Jan. 19, 2005

(87) PCT Pub. No.: WO2004/013235

PCT Pub. Date: Feb. 12, 2004

(65) Prior Publication Data

US 2005/0241080 A1    Nov. 3, 2005

(30) Foreign Application Priority Data

Jul. 24, 2002    (EP) .................................. 02405646

(51) Int. Cl.
*C09B 62/507* (2006.01)
*C09B 62/08* (2006.01)
*D06P 1/384* (2006.01)
*C09D 11/02* (2006.01)

(52) U.S. Cl. ...................... 534/618; 534/612; 534/617; 534/622; 534/635; 534/636; 534/637; 8/466; 8/549; 106/31.48

(58) Field of Classification Search ............... 534/618, 534/622, 635–637; 8/466, 549; 106/31.48
See application file for complete search history.

(56) References Cited

U.S. PATENT DOCUMENTS

| | | | |
|---|---|---|---|
| 4,885,360 A | 12/1989 | Scheibli .................... | 534/642 |
| 5,292,871 A | 3/1994 | Schläfer et al. ............ | 534/641 |
| 5,484,899 A | 1/1996 | Deitz et al. ................ | 534/618 |
| 5,625,042 A | 4/1997 | Jäger et al. ................. | 534/637 |
| 5,801,230 A | 9/1998 | Jäger et al. ................. | 534/642 |
| 6,323,327 B1 | 11/2001 | Tzikas et al. .............. | 534/637 |

FOREIGN PATENT DOCUMENTS

EP    1097971    5/2001
GB    1155149    6/1969

*Primary Examiner*—Fiona T. Powers
(74) *Attorney, Agent, or Firm*—Kevin T. Mansfield

(57) ABSTRACT

Reactive dyes of formula (I), wherein A is the radical of a monoazo, polyazo, metal complex azo, anthraquinone, phthalocyanine, formazan or dioxazine chromophore, $Q_1$, and $Q_2$ are each independently of the other hydrogen or unsubstituted or substituted $C_1$–$C_4$alkyl, $(Q_3)_n$ denotes n substituents selected from the group $C_1$–$C_4$alkyl, $C_1$–$C_4$alkoxy, halogen and sulfo, X is halogen, 3-carboxy-pyridin-1-yl, 3-carbamoylpyridin-1-yl, hydroxy, $C_1$–$C_4$alkoxy unsubstituted or substituted in the alkyl moiety, phenoxy unsubstituted or substituted in the phenyl moiety, $C_1$–$C_4$alkylthio unsubstituted or substituted in the alkyl moiety, unsubstituted or substituted amino, or an N-heterocycle which may or may not contain further hetero atoms, Y is vinyl or a radical —$CH_2$—$CH_2$—U and U is a group removable under alkaline conditions, k is a number 2, 3, 4, 5 or 6, m is a number 0 or 1, and n is a number 0, 1 or 2, with the proviso that when A denotes a monoazo chromophore it is not directly linked to the triazinyl radical through a hydroxynaphthalenesulfonic acid coupling component and does not denote a radical of formula (II), are suitable for dyeing cellulosic or nitrogen-containing fiber materials

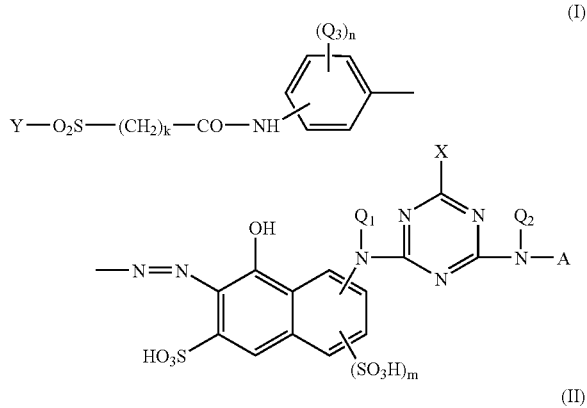

15 Claims, No Drawings

FIBER-REACTIVE AZO DYES, THEIR PREPARATION AND THEIR USE

The present invention relates to fibre-reactive azo dyes, to processes for the preparation thereof and to the use thereof in dyeing or printing textile fibre materials.

The practice of dyeing using reactive dyes has recently led to higher demands being made of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, improved reactive dyes having the qualities characterised above to a high degree. The dyes should especially be distinguished by high fixing yields and high fibre-dye binding stability; it should also be possible for dye that is not fixed to the fibre to be washed off easily. The dyes should also yield dyeings having good all-round fastness properties, for example light-fastness and wet-fastness properties.

It has been shown that the problem posed is largely solved by the dyes defined below.

The present invention accordingly relates to reactive dyes of formula

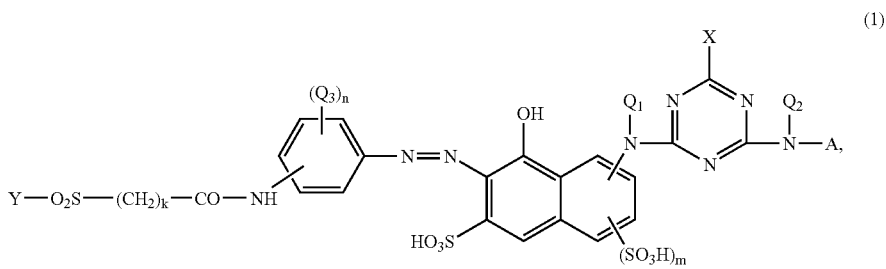

(1)

wherein
A is the radical of a monoazo, polyazo, metal complex azo, anthraquinone, phthalocyanine, formazan or dioxazine chromophore,
$Q_1$ and $Q_2$ are each independently of the other hydrogen or unsubstituted or substituted $C_1$–$C_4$alkyl,
$(Q_3)_n$ denotes n substituents selected from the group $C_1$–$C_4$alkyl, $C_1$–$C_4$alkoxy, halogen and sulfo,
X is halogen, 3–Carboxypyridin-1-yl, 3–Carbamoylpyridin-1-yl, hydroxy, $C_1$–$C_4$alkoxy unsubstituted or substituted in the alkyl moiety, phenoxy unsubstituted or substituted in the phenyl moiety, $C_1$–$C_4$alkylthio unsubstituted or substituted in the alkyl moiety, unsubstituted or substituted amino, or an N-heterocycle which may or may not contain further hetero atoms,
Y is vinyl or a radical —$CH_2$—$CH_2$—U and U is a group removable under alkaline conditions,
k is a number 2, 3, 4, 5 or 6,
m is a number 0 or 1, and
n is a number 0, 1 or 2, with the proviso that when A denotes a monoazo chromophore it is not directly linked to the triazinyl radical through a hydroxynaphthalenesulfonic acid coupling component and does not denote a radical of formula

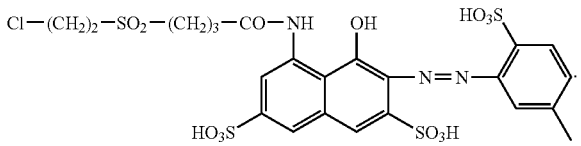

The radicals $Q_1$ and $Q_2$ as alkyl radicals are straight-chained or branched and may be further substituted, for example by hydroxy, sulfo, sulfato, cyano or carboxy. The following radicals may be mentioned as examples: methyl, ethyl, n-propyl, isopropyl, n-butyl, isobutyl, sec-butyl and tert-butyl, and the corresponding substituted radicals. As substituents, preference is given to hydroxy, sulfo, sulfato or carboxy, especially hydroxy or sulfato.

$Q_1$ and $Q_2$ preferably are each independently of the other hydrogen or $C_1$–$C_4$alkyl, especially hydrogen, methyl or ethyl and very especially hydrogen.

$Q_3$ as halogen is, for example, fluorine, chlorine or bromine, preferably chlorine or bromine and especially chlorine.

$Q_3$ as $C_1$–$C_4$alkyl is, for example, methyl, ethyl, n-propyl, isopropyl, n-butyl, isobutyl, sec-butyl or tert-butyl, preferably methyl or ethyl and especially methyl.

$Q_3$ as $C_1$–$C_4$alkoxy may be, for example, methoxy, ethoxy, n-propoxy, isopropoxy, n-butoxy or isobutoxy, preferably methoxy or ethoxy and especially methoxy.

$Q_3$ is preferably sulfo.

X as halogen is, for example, fluorine, chlorine or bromine and especially chlorine or fluorine.

X as $C_1$–$C_4$alkoxy is, for example, methoxy, ethoxy, n- or iso-propoxy, n-, sec-, iso- or tert-butoxy, preferably methoxy, ethoxy or isopropoxy and especially methoxy. The radicals mentioned are unsubstituted or substituted in the alkyl moiety, for example by $C_1$–$C_4$alkoxy, hydroxy, sulfo or carboxy. Preference is given to the unsubstituted radicals.

X as phenoxy is unsubstituted or substituted in the phenyl moiety, for example by $C_1$–$C_4$alkyl, $C_1$–$C_4$alkoxy, $C_2$–$C_4$alkanoylamino, hydroxy, sulfo or carboxy. Preference is given to the unsubstituted or sulfo-substituted radicals.

X as $C_1$–$C_4$alkylthio is, for example, methylthio, ethylthio, n-propylthio, isopropylthio or n-butylthio, especially methylthio or ethylthio. The radicals mentioned are unsubstituted or substituted in the alkyl moiety by hydroxy, carboxy or sulfo. Preference is given to the unsubstituted radicals.

X as unsubstituted or substituted amino is amino which is unsubstituted or substituted at the nitrogen atom, for example being one of the following radicals:

N-mono- or N,N-di-$C_1$–$C_4$alkylamino, which includes both the unsubstituted radicals and the radicals which are uninterrupted or interrupted in the alkyl moiety or moieties by oxygen as well as those which are substituted in the alkyl moiety or moieties, for example by $C_2$–$C_4$alkanoylamino, $C_1$–$C_4$alkoxy, hydroxy, sulfo, sulfato, carboxy, cyano, carbamoyl or sulfamoyl, preferably by $C_1$–$C_4$alkoxy, hydroxy, sulfo or sulfato; preference is given to the radicals substituted in the alkyl moiety or moieties; as examples there may be mentioned N-methylamino, N-ethylamino, N-propylamino, N,N-di-methylamino and N,N-di-ethylamino, N-β-hydroxyethylamino, N,N-di-β-hydroxyethylamino, N-2-(β-hydroxyethoxy)ethylamino, N-2-[2-(β-hydroxyethoxy)ethoxy]ethylamino, N-β-sulfatoethylamino, N-β-sulfoethylamino, N-carboxymethylamino, N-β-carboxyethylamino, N-α,β-dicarboxy-ethylamino, N-α,γ-dicarboxypropylamino, N-ethyl-N-β-hydroxyethylamino and N-methyl-N-β-hydroxyethylamino;

$C_5$–$C_7$cycloalkylamino, which includes both the unsubstituted radicals and the radicals substituted in the cycloalkyl ring, for example by $C_1$–$C_4$alkyl, especially methyl, or carboxyl; preference is given, as such radicals, to the corresponding cyclohexyl radicals;

phenylamino or N—$C_1$–$C_4$alkyl-N-phenylamino, which includes both the unsubstituted radicals and the radicals substituted in the phenyl ring, for example by $C_1$–$C_4$alkyl, $C_1$–$C_4$alkoxy, $C_2$–$C_4$alkanoylamino, carboxy, carbamoyl, sulfo or halogen, for example 2-, 3- or 4-chloro-phenylamino, 2-, 3- or 4-methylphenylamino, 2-, 3- or 4-methoxyphenylamino, 2-, 3- or 4-sulfophenylamino, disulfophenylamino, or 2-, 3- or 4-carboxyphenylamino; preference is given to such radicals being unsubstituted or substituted in the phenyl ring by sulfo;

naphthylamino, which is unsubstituted or substituted in the naphthyl ring system, for example by sulfo; preference is given to the radicals substituted by from 1 to 3 sulfo groups, for example 1- or 2-naphthylamino, 1-sulfo-2-naphthylamino, 1,5-disulfo-2-naphthylamino or 4,8-disulfo-2-naphthylamino; or benzylamino, which is unsubstituted or substituted in the phenyl moiety, for example by $C_1$–$C_4$alkyl, $C_1$–$C_4$alkoxy, carboxy, sulfo or halogen.

X as an N-heterocycle which may or may not contain further hetero atoms is, for example, morpholino or piperidin-1-yl.

X is preferably fluorine, chlorine, $C_1$–$C_4$alkoxy, $C_1$–$C_4$alkylthio, hydroxy, amino, N-mono- or N,N-di-$C_1$–$C_4$alkylamino unsubstituted or substituted in the alkyl moiety or moieties by hydroxy, sulfato or sulfo, phenylamino unsubstituted or substituted in the phenyl ring by sulfo, carboxy, acetylamino, chlorine, methyl, ethyl, methoxy or ethoxy, or N—$C_1$–$C_4$alkyl-N-phenylamino wherein the alkyl is unsubstituted or substituted by hydroxy, sulfo or sulfato, naphthylamino which is unsubstituted or substituted by from 1 to 3 sulfo groups, or morpholino.

X is especially fluorine, chlorine, amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-sulfophenylamino or N—$C_1$–$C_4$alkyl-N-phenylamino.

X is very especially fluorine, chlorine, amino, N-β-hydroxyethylamino, N,N-di-β-hydroxyethylamino, morpholino or 2-, 3- or 4-sulfophenylamino.

Of very special importance for X is the meaning fluorine or chlorine, especially chlorine.

As a group U removable under alkaline conditions there come into consideration, for example, —Cl, —Br, —F, —$OSO_3H$, —$SSO_3H$, —$OCO$—$CH_3$, —$OPO_3H_2$, —OCO—$C_6H_5$, —$OSO_2$—$C_1$–$C_4$alkyl or —$OSO_2$—N($C_1$–$C_4$alkyl)$_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$.

Examples of suitable radicals Y are accordingly vinyl, β-bromo- or β-chloro-ethyl, β-acetoxy-ethyl, β-benzoyloxyethyl, β-phosphatoethyl, β-sulfatoethyl and β-thiosulfatoethyl. Y is preferably vinyl, β-chloroethyl or β-sulfatoethyl.

k is preferably a number 2 or 3, especially 3.

m is preferably the number 1.

n is preferably the number 1.

As substituents for A there come into consideration the customary substituents for dyes. The following may be mentioned as examples: $C_1$–$C_4$alkyl, which is understood to be methyl, ethyl, n- or iso-propyl, n-, iso-, sec- or tert-butyl; $C_1$–$C_4$alkoxy, which is understood to be methoxy, ethoxy, n- or iso-propoxy or n-, iso-, sec- or tert-butoxy; hydroxy-$C_1$–$C_4$alkoxy; phenoxy; $C_2$–$C_6$alkanoylamino unsubstituted or substituted in the alkyl moiety by hydroxy or $C_1$–$C_4$alkoxy, for example acetylamino, hydroxyacetylamino, methoxyacetylamino or propionylamino; benzoylamino unsubstituted or substituted in the phenyl moiety by hydroxy, sulfo, halogen, $C_1$–$C_4$alkyl or $C_1$–$C_4$alkoxy; $C_1$–$C_6$alkoxycarbonylamino unsubstituted or substituted in the alkyl moiety by hydroxy, $C_1$–$C_4$alkyl or $C_1$–$C_4$alkoxy; phenoxycarbonylamino unsubstituted or substituted in the phenyl moiety by hydroxy, $C_1$–$C_4$alkyl or $C_1$–$C_4$alkoxy; amino; N—$C_1$–$C_4$alkyl- or N,N-di-$C_1$–$C_4$alkyl-amino unsubstituted or substituted in the alkyl moiety or moieties by hydroxy, $C_1$–$C_4$alkoxy, carboxy, cyano, halogen, sulfo, sulfato, phenyl or sulfophenyl, for example methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)-amino, N-(β-sulfoethyl)-N-benzylamino; cyclohexylamino; N-phenylamino or N—$C_1$–$C_4$alkyl-N-phenylamino unsubstituted or substituted in the phenyl moiety by nitro, $C_1$–$C_4$alkyl, $C_1$–$C_4$alkoxy, carboxy, halogen or sulfo; $C_1$–$C_4$alkoxycarbonyl, for example methoxy- or ethoxy-carbonyl; trifluoromethyl; nitro; cyano; halogen, which is understood in general to be, for example, fluorine, bromine or, especially, chlorine; ureido; hydroxy; carboxy; sulfo; sulfomethyl; carbamoyl; carbamido; sulfamoyl; N-phenylsulfamoyl or N—$C_1$–$C_4$alkyl-N-phenylsulfamoyl unsubstituted or substituted in the phenyl moiety by sulfo or carboxy; methyl- or ethylsulfonyl.

Fibre-reactive radicals also come into consideration as substituents for A.

Fibre-reactive radicals are to be understood as being those which are capable of reacting with the hydroxy groups of cellulose, with the amino, carboxy, hydroxy and thiol groups in wool and silk or with the amino and possibly carboxy groups of synthetic polyamides to form covalent chemical bonds. The fibre-reactive radicals are generally bonded to the dye radical directly or via a bridging member. Suitable fibre-reactive radicals are, for example, those having at least one removable substituent at an aliphatic, aromatic or heterocyclic radical or those wherein the mentioned radicals contain a radical suitable for reaction with the fibre material, for example a vinyl radical.

A fibre-reactive radical present in A corresponds, for example, to formula $$—SO_2—Y \quad (2a),$$

$$—NH—CO—(CH_2)_k—SO_2—Y \quad (2b),$$

$$—CONR_2—(CH_2)_l—SO_2—Y \quad (2c),$$

$$—NH—CO—CH(Hal)\text{-}CH_2\text{-}Hal \quad (2d),$$

$$—NH—CO—C(Hal)=CH_2 \quad (2e),$$

(2f)

(2g)

wherein
Hal is chlorine or bromine,
$X_1$ is halogen, 3–Carboxypyridin-1-yl or 3–Carbamoylpyridin-1-yl,
$T_1$ has independently the same definitions as $X_1$, or is a non-fibre-reactive substituent or a fibre-reactive radical of formula $$—\underset{R_2}{\underset{|}{N}}—alk—SO_2—Y, \overset{R_3}{\phantom{x}} \quad (3a)$$

$$—\underset{R_1}{\underset{|}{N}}—alk—Q—alk_1—SO_2—Y, \quad (3b)$$

$$—\underset{R_1}{\underset{|}{N}}—arylene—SO_2—Y, \quad (3c)$$

$$—\underset{R_1}{\underset{|}{N}}—arylene—(alk)_t—W—alk_1—SO_2—Y, \quad (3d)$$

(3e)

$$—\underset{R_1}{\underset{|}{N}}—arylene—NH—CO—Y_1, \quad (3f)$$

wherein $R_1$, $R_{1a}$ and $R_{1b}$ are each independently of the others hydrogen or $C_1$–$C_4$alkyl,
$R_2$ is hydrogen, $C_1$–$C_4$alkyl unsubstituted or substituted by hydroxy, sulfo, sulfato, carboxy or cyano, or a radical $$—\underset{\phantom{x}}{\underset{\phantom{x}}{alk}}—SO_2—Y, \overset{R_3}{\phantom{x}}$$

$R_3$ is hydrogen, hydroxy, sulfo, sulfato, carboxy, cyano, halogen, $C_1$–$C_4$alkoxycarbonyl,
$C_1$–$C_4$alkanoyloxy, carbamoyl or a group —$SO_2$—Y,
alk and $alk_1$ are each independently of the other linear or branched $C_1$–$C_6$alkylene,
arylene is a phenylene or naphthylene radical unsubstituted or substituted by sulfo, carboxy,
$C_1$–$C_4$alkyl, $C_1$–$C_4$alkoxy or halogen,
Q is a radical —O— or —$NR_1$— wherein $R_1$ is as defined above,
W is a group —$SO_2$—$NR_2$—, —$CONR_2$— or —$NR_2CO$— wherein $R_2$ is as defined above,
Y has the definitions and preferred meanings given above,
$Y_1$ is a group —CH(Hal)-$CH_2$-Hal or —C(Hal)=$CH_2$, Hal being as defined above, and k and l are each independently of the other an integer from 1 to 6 and t is a number 0 or 1, and
$X_2$ is halogen or $C_1$–$C_4$alkylsulfonyl,
$X_3$ is halogen or $C_1$–$C_4$alkyl, and
$T_2$ is hydrogen, cyano or halogen.

$R_1$, $R_{1a}$ and $R_{1b}$ preferably are each independently of the others hydrogen, methyl or ethyl, especially hydrogen.

$R_2$ is preferably hydrogen or $C_1$–$C_4$alkyl, such as methyl, ethyl, propyl, isopropyl, butyl, isobutyl, sec-butyl or tert-butyl, and especially hydrogen, methyl or ethyl. $R_2$ is more especially hydrogen.

$R_3$ is preferably hydrogen.

k and l preferably are each independently of the other a number 2, 3 or 4, especially a number 2 or 3.

Very especially, k is the number 3 and l is the number 2.

For a non-fibre-reactive substituent $T_1$ there come into consideration, for example, hydroxy or one of the radicals indicated above for X in the meaning of $C_1$–$C_4$alkoxy unsubstituted or substituted in the alkyl moiety, phenoxy unsubstituted or substituted in the phenyl moiety, $C_1$–$C_4$alkylthio unsubstituted or substituted in the alkyl moiety, unsubstituted or substituted amino, or an N-heterocycle which may or may not contain further hetero atoms.

As a non-fibre-reactive radical, $T_1$ is preferably $C_1$–$C_4$alkoxy, $C_1$–$C_4$alkylthio, hydroxy, amino, N-mono- or N,N-di-$C_1$–$C_4$alkylamino unsubstituted or substituted in the alkyl moiety or moieties by hydroxy, sulfato or sulfo, morpholino, or phenylamino or N—$C_1$–$C_4$alkyl-N-phenylamino (wherein the alkyl is unsubstituted or substituted by hydroxy, sulfo or sulfato) each unsubstituted or substituted in the phenyl ring by sulfo, carboxy, acetylamino, chlorine, methyl or methoxy, or naphthylamino unsubstituted or substituted by from 1 to 3 sulfo groups.

Especially preferred non-fibre-reactive radicals $T_1$ are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—$C_1$–$C_4$alkyl-N-phenylamino.

$X_1$ is preferably halogen, for example fluorine, chlorine or bromine and especially chlorine or fluorine.

$T_2$, $X_2$ and $X_3$ as halogen are, for example, fluorine, chlorine or bromine, especially chlorine or fluorine.

$X_2$ as $C_1$–$C_4$alkylsulfonyl is, for example, ethylsulfonyl or methylsulfonyl and especially methylsulfonyl.

$X_3$ as $C_1$–$C_4$alkyl is, for example, methyl, ethyl, n- or iso-propyl, n-, iso- or tert-butyl and especially methyl.

$X_2$ and $X_3$ preferably are each independently of the other chlorine or fluorine.

$T_2$ is preferably cyano or chlorine.

Hal is preferably bromine.

alk and $alk_1$ are each independently of the other, for example, a methylene, ethylene, 1,3-propylene, 1,4-butylene, 1,5-pentylene or 1,6-hexylene radical or a branched isomer thereof.

alk and $alk_1$ preferably are each independently of the other a $C_1$–$C_4$alkylene radical and especially an ethylene radical or propylene radical.

arylene is preferably a 1,3- or 1,4-phenylene radical unsubstituted or substituted, for example, by sulfo, methyl, methoxy or carboxy, and especially an unsubstituted 1,3- or 1,4-phenylene radical.

Q is preferably —NH— or —O— and especially —O—.

W is preferably a group of formula —CONH— or —NHCO—, especially a group of formula —CONH—.

t is preferably the number 0.

The reactive radicals of formulae (3a) to (3f) are preferably those wherein W is a group of formula —CONH—, $R_1$, $R_2$ and $R_3$ are each hydrogen, Q is a radical —O— or —NH—, alk and $alk_1$ are each independently of the other ethylene or propylene, arylene is phenylene unsubstituted or substituted by methyl, methoxy, carboxy or sulfo, Y is vinyl or β-sulfatoethyl, $Y_1$ is —CHBr—CH$_2$Br or —CBr═CH$_2$ and t is the number 0.

A fibre-reactive radical present in A corresponds especially to a radical of formula (2a), (2c), (2d), (2e) or (2f) wherein Y is vinyl, β-chloroethyl or β-sulfatoethyl, Hal is bromine, $R_2$ and $R_{1a}$ are hydrogen, l is a number 2 or 3, $X_1$ is halogen, $T_1$ is $C_1$–$C_4$alkoxy, $C_1$–$C_4$alkylthio, hydroxy, amino, N-mono- or N,N-di-$C_1$–$C_4$alkylamino unsubstituted or substituted in the alkyl moiety or moieties by hydroxy, sulfato or sulfo, morpholino, or phenylamino or N—$C_1$–$C_4$alkyl-N-phenylamino (wherein the alkyl is unsubstituted or substituted by hydroxy, sulfo or sulfato) each unsubstituted or substituted in the phenyl ring by sulfo, carboxy, acetylamino, chlorine, methyl or methoxy, or naphthylamino unsubstituted or substituted by from 1 to 3 sulfo groups, or is a fibre-reactive radical of formula (3a'), (3b'), (3c'), (3d') or (3f')

  (3a'),

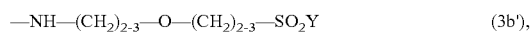  (3b'),

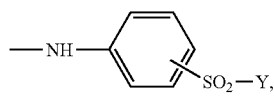  (3c')

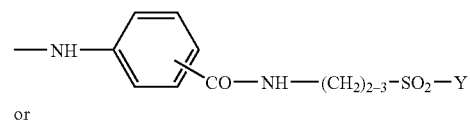  (3d')

or

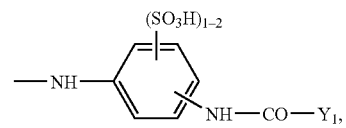  (3f')

especially (3c') or (3d'), wherein

Y is as defined above, and $Y_1$ is a group —CH(Br)—CH$_2$—Br or —C(Br)═CH$_2$.

In the case of the radicals of formulae (3a') and (3b'), Y is preferably β-chloroethyl. In the case of the radicals of formulae (3c') and (3d'), Y is preferably vinyl or β-sulfatoethyl.

A denotes, for example, the following dye radicals:

a) Dye radicals of a 1:1 copper complex azo dye, of the benzene or naphthalene series, wherein the copper atom is in each case bonded, on each side in the position ortho to the azo bridge, to a group capable of being metallated.

b) Dye radicals of a mono- or dis-azo dye of formula

 (4) or

 (5)

or of a metal complex derived therefrom, wherein $D_1$ and $D_2$ are each independently of the other radicals of a diazo component, of the benzene or naphthalene series, M is the radical of a central component, of the benzene or naphthalene series, $K_1$ and $K_2$ are each independently of the other the radical of a coupling component, of the benzene, naphthalene, pyrazolone, 6-hydroxypyrid-2-one or acetoacetic acid arylamide series, u is a number 0 or 1, and $D_1$, $D_2$, M, $K_1$ and $K_2$ may carry substituents customary for azo dyes, wherein $K_2$ in the meaning of a radical from the naphthalene series does not carry a radical of formula (2b).

When u is the number 0, $K_1$ is preferably the radical of a coupling component, of the benzene, pyrazolone, 6-hydroxypyrid-2-one or acetoacetic acid arylamide series.

c) Dye radicals of a disazo dye of formula

 (6)

wherein $D_3$ and $D_4$ are each independently of the other radicals of a diazo component, of the benzene or naphthalene series, and $K_3$ is the radical of a coupling component, of the naphthalene series; wherein $D_3$, $D_4$ and $K_3$ may carry substituents customary for azo dyes.

The expression "substituents customary for azo dyes" is intended to include both fibre-reactive and non-fibre-reactive substituents, for example the substituents mentioned above.

d) Dye radicals of a formazan dye of formula

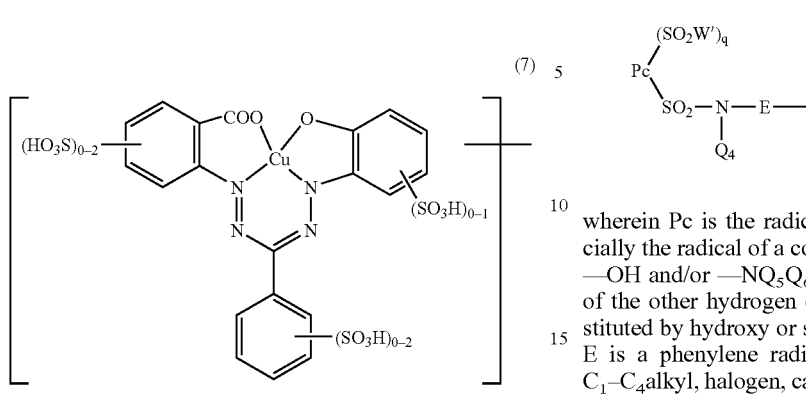
(7)

wherein the benzene rings contain no further substituents or are further substituted by $C_1$–$C_4$alkyl, $C_1$–$C_4$alkoxy, $C_1$–$C_4$alkylsulfonyl, halogen or carboxy.

e) Dye radicals of an anthraquinone dye of formula

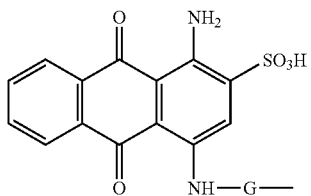
(8)

wherein G is a phenylene radical unsubstituted or substituted by $C_1$–$C_4$alkyl, $C_1$–$C_4$alkoxy, halogen, carboxy or sulfo or is a cyclohexylene, phenylenemethylene or $C_2$–$C_6$alkylene radical.

f) Dye radicals of a phthalocyanine dye of formula

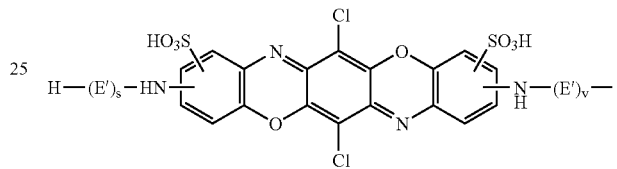
(9)

wherein Pc is the radical of a metal phthalocyanine, especially the radical of a copper or nickel phthalocyanine, W' is —OH and/or —$NQ_5Q_6$, $Q_5$ and $Q_6$ are each independently of the other hydrogen or $C_1$–$C_4$alkyl unsubstituted or substituted by hydroxy or sulfo, $Q_4$ is hydrogen or $C_1$–$C_4$alkyl, E is a phenylene radical unsubstituted or substituted by $C_1$–$C_4$alkyl, halogen, carboxy or sulfo or is a $C_2$–$C_6$alkylene radical, and q is from 1 to 3.

g) Dye radicals of a dioxazine dye of formula (10)

wherein E' is a phenylene radical unsubstituted or substituted by $C_1$–$C_4$alkyl, halogen, carboxy or sulfo or is a $C_2$–$C_6$alkylene radical, s and v are each independently of the other a number 0 or 1, and the outer benzene rings in formula (10) may be further substituted by $C_1$–$C_4$alkyl, $C_1$–$C_4$alkoxy, acetylamino, nitro, halogen, carboxy, sulfo or a fibre-reactive radical of formula (2a), Y having the definitions and preferred meanings given above.

For A as a radical of a mono- or dis-azo dye of formula (4), (5) or (6) in the dyes of formula (1) according to the invention, preference is given to the dye radicals of formulae (11a), (11b), (11c), (11d), (11e), (11f), (11g), (11h), (11i), (11j), (11k), (11l), (11m), (11n), (11o), (11p), (11q) and (11r) given below:

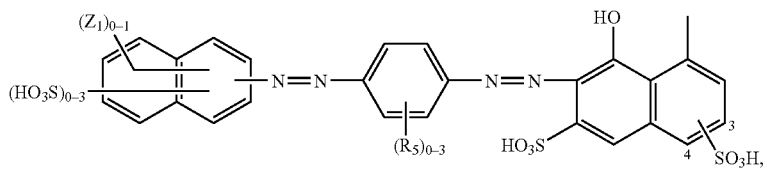
(11a)

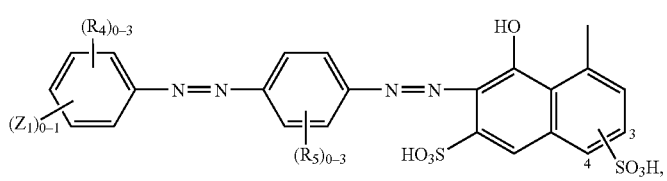
(11b)

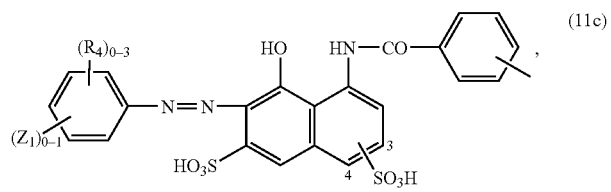
(11c)

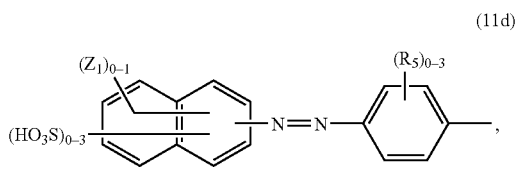
(11d)

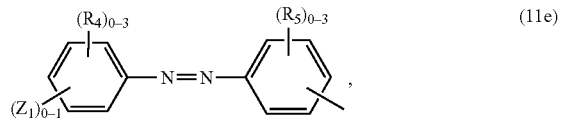
(11e)

wherein $(R_4)_{0-3}$ denotes from 0 to 3 identical or different substituents from the group $C_1$–$C_4$alkyl, $C_1$–$C_4$alkoxy, halogen, carboxy and sulfo, $(R_5)_{0-3}$ denotes from 0 to 3 identical or different substituents from the group halogen, nitro, cyano, trifluoromethyl, sulfamoyl, carbamoyl, $C_1$–$C_4$alkyl; $C_1$–$C_4$alkoxy unsubstituted or substituted by hydroxy, sulfato or $C_1$–$C_4$alkoxy; amino, $C_2$–$C_4$alkanoylamino, ureido, hydroxy, carboxy, sulfomethyl, $C_1$–$C_4$alkylsulfonylamino and sulfo, and $Z_1$ is a radical of formula (2a), (2c), (2d), (2e) or (2f), preferably (2a), (2c), (2d) or (2e) and especially (2a), the mentioned radicals having the definitions and preferred meanings given above,

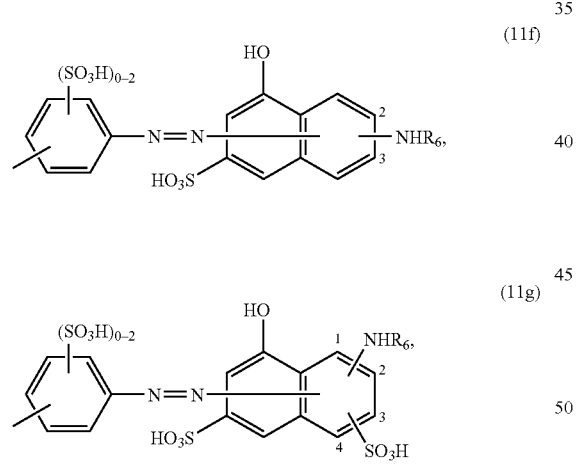

(11f)

(11g)

(11h)

wherein $R_6$ is hydrogen, $C_1$–$C_4$alkyl, sulfophenyl, $C_2$–$C_4$alkanoyl, benzoyl or a radical of formula (2f) given above, wherein the radicals have the definitions and preferred meanings given above,

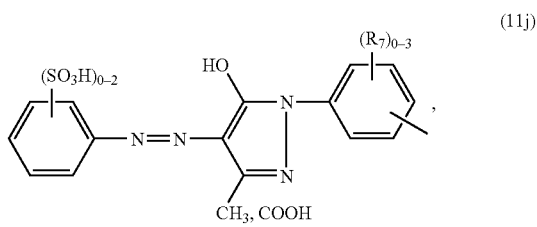

(11i)

(11j)

wherein $(R_7)_{0-3}$ denotes from 0 to 3 identical or different substituents from the group $C_1$–$C_4$alkyl, $C_1$–$C_4$alkoxy, halogen, carboxy and sulfo,

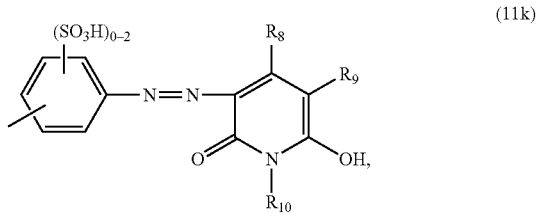

(11k)

wherein $R_8$ and $R_{10}$ are each independently of the other hydrogen, $C_1$–$C_4$alkyl or phenyl, and $R_9$ is hydrogen, cyano, carbamoyl or sulfomethyl,

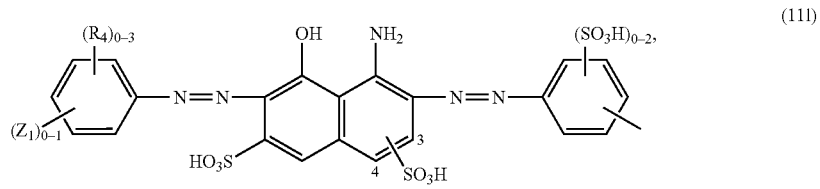
(11l)
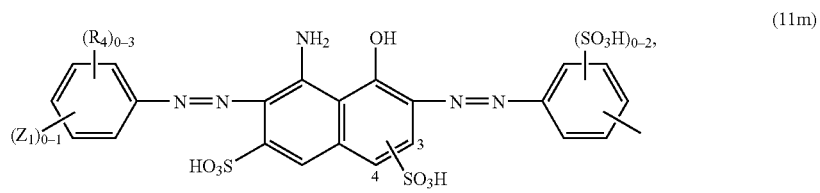
(11m)
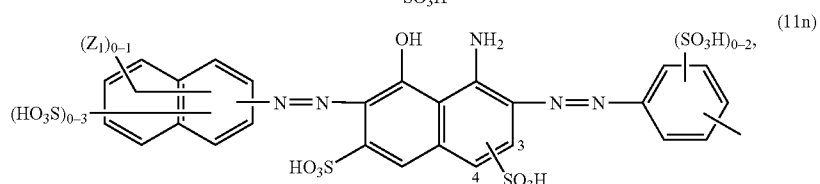
(11n)
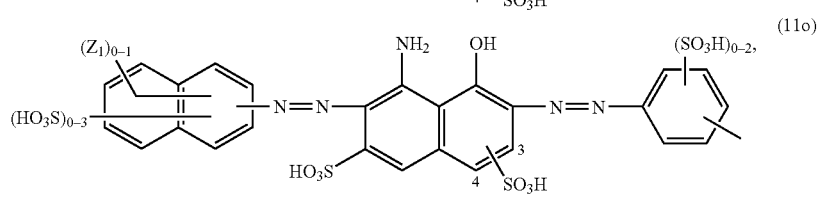
(11o)
wherein $(R_4)_{0-3}$ and $Z_1$ each have the definitions and preferred meanings given above,
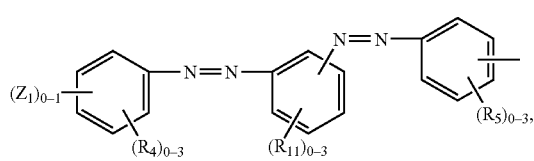
(11p)
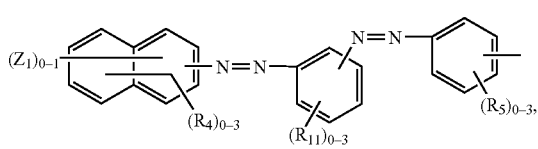
(11q)
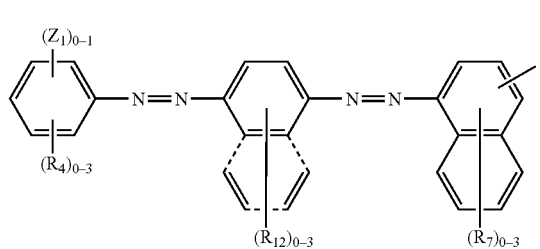
(11r)
and -continued

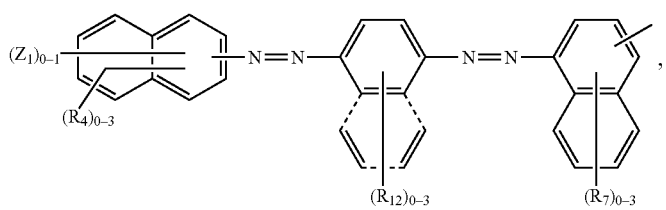
(11s)

wherein $(R_4)_{0-3}$, $(R_5)_{0-4}$ and $(R_7)_{0-3}$ each have the definitions and preferred meanings given above, $(R_{11})_{0-3}$ and $(R_{12})_{0-3}$ each independently of the other denote from 0 to 3 identical or different substituents from the group $C_1$–$C_4$alkyl, $C_1$–$C_4$alkoxy, halogen, carboxy and sulfo, and $Z_1$ has the definitions and preferred meanings given above.

The numbers on the naphthyl rings of the radicals of formulae (11a), (11b), (11c), (11f), (11g), (11h), (11l), (11m), (11n) and (11o) indicate the possible bonding positions.

$(R_4)_{0-3}$ in the disazoamino radicals of formulae (11q) and (11s) preferably denotes from 1 to 3 sulfo groups.

$Z_1$ in the indicated dye radicals A is especially hydrogen.

Examples of suitable dye radicals A in the reactive dyes according to the invention are listed in U.S. Pat. No. 5,484,899 (columns 13 to 40 and 47 to 71).

For A as the radical of a mono- or dis-azo dye of formula (4), (5) or (6), special preference is given to the radicals of formulae (11d), (11e), (11f), (11g), (11h), (11i), (11j), (11k), (11l), (11m), (11n), (11o), (11p), (11q) and (11r).

Very especially preferred radicals of a mono- or dis-azo dye of formula (4), (5) or (6) correspond to formulae (11d), (11e), (11f), (11g), (11i), (11j), (11k), (11l), (11m), (11p) and (11q).

A is preferably the radical of a mono- or dis-azo dye.

In an especially preferred embodiment of the dyes according to the invention, A is a mono- or dis-azo dye radical of formula (11d), (11e), (11f), (11g), (11i), (11j), (11k), (11l), (11m), (11p) or (11q), wherein $(R_4)_{0-3}$, $(R_5)_{0-3}$, $R_6$, $(R_7)_{0-3}$, $R_8$, $R_9$, $R_{10}$, $(R_{11})_{0-3}$ and $Z_1$ each have the definitions given above, and $(R_4)_{0-4}$ preferably denotes from 0 to 3 identical or different substituents from the group methyl, methoxy and sulfo, $(R_5)_{0-3}$ preferably denotes from 0 to 3 identical or different substituents from the group methyl, ethyl, methoxy, ethoxy, β-hydroxy-ethoxy, β-sulfatoethoxy, sulfo, acetylamino and ureido, $R_6$ is preferably hydrogen, methyl, ethyl, acetyl, propionyl, benzoyl or a radical of formula (2f) given above, wherein the definitions and preferred meanings are as given above, $(R_7)_{0-3}$ preferably denotes from 0 to 3 identical or different substituents from the group methyl, methoxy, chlorine, carboxy and sulfo, $R_8$ and $R_{10}$ are each independently of the other hydrogen, methyl or ethyl, $(R_{11})_{0-3}$ preferably denotes from 0 to 3 identical or different substituents from the group methyl, ethyl, methoxy, ethoxy, carboxy and sulfo, and $Z_1$, when present, is preferably a fibre-reactive radical of formula (2a) wherein Y is vinyl or β-sulfatoethyl.

The reactive dye of formula (1) is preferably a dye of formula

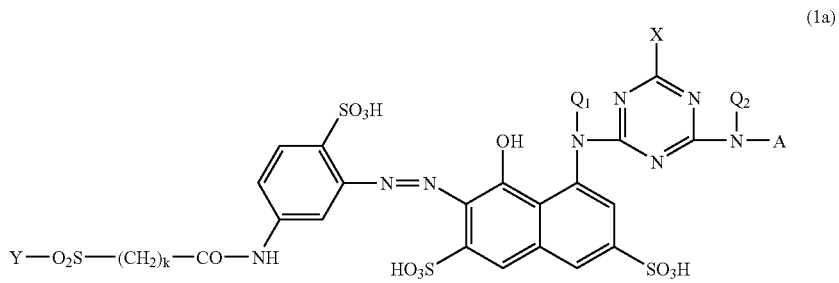
(1a)

wherein A, $Q_1$, $Q_2$, X, Y and k each have the definitions and preferred meanings given above.

An especially preferred embodiment of the present invention relates to reactive dyes of formula (1a) wherein $Q_1$ and $Q_2$ are hydrogen, A is a mono- or dis-azo dye radical of formula (11d), (11e), (11f), (11g), (11i), (11j), (11k), (11l), (11m), (11p) or (11q) wherein $(R_4)_{0-3}$, $(R_5)_{0-3}$, $R_6$, $(R_7)_{0-3}$, $R_8$, $R_9$, $R_{10}$, $(R_{11})_{0-3}$ and $Z_1$ each have the definitions and preferred meanings given above, X is fluorine or chlorine, Y is vinyl, β-chloroethyl or β-sulfatoethyl, preferably vinyl or β-chloroethyl, and k is a number 2 or 3.

The present invention relates also to a process for the preparation of the reactive dyes according to the invention, wherein approximately one molar equivalent of a compound of formula

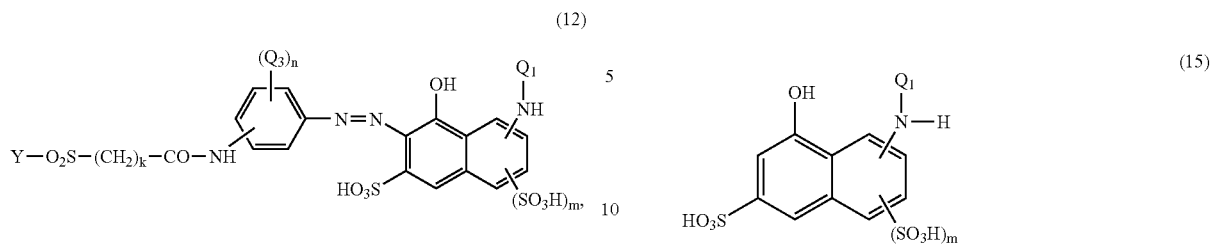
(12)

approximately one molar equivalent of a compound of formula

A-NHQ₂ (13), or suitable precursors of the compounds of formula (12) or (13), and approximately one molar equivalent of a compound of formula

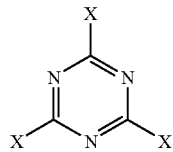
(14)

are reacted with one another step-wise, in any order, or, if using precursors of compounds of formula (12) or (13), the intermediates obtained are converted into the desired dyes and, where appropriate, a further transformation reaction is subsequently carried out, A, $Q_1$, $Q_2$, $Q_3$, Y, k, m and n in each case having the definitions and preferred meanings given above and X being halogen, for example chlorine or fluorine, preferably chlorine.

For example, in a first condensation step, a compound of formula (12) is reacted with a compound of formula (14) and then, in a second condensation step, the intermediate obtained is reacted with a compound of formula (13), or, in a first condensation step, a compound of formula (13) is reacted with a compound of formula (14) and then, in a second condensation step, the intermediate obtained is reacted with a compound of formula (12).

When the use of precursors of compounds of formula (12) or (13) requires the transformation of intermediates into the final dyes, such a transformation involves especially coupling reactions that result in azo dyes.

A process variant comprises, for example, reacting approximately one molar equivalent of a compound of formula (13) and approximately one molar equivalent of a compound of formula

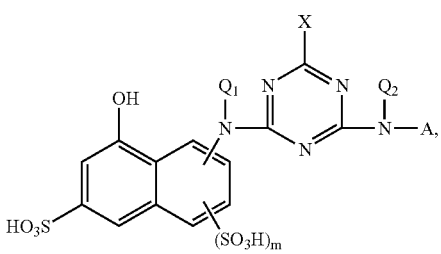
(15)

step-wise, in any order, with approximately one molar equivalent of a compound of formula (14) to form a compound of formula

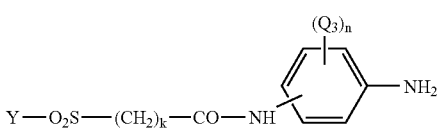
(16)

diazotising a compound of formula

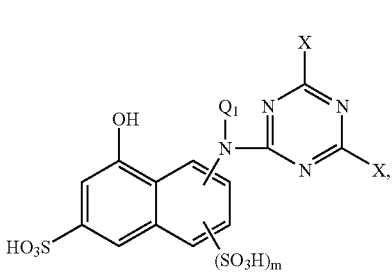
(17)

and coupling to the compound of formula (16).

A further, preferred, process variant is distinguished by reacting approximately one molar equivalent of a compound of formula (15) with approximately one molar equivalent of a compound of formula (14) to form a compound of formula (18)

diazotising a compound of formula (17) and coupling to the compound of formula (18), whereupon the compound of formula

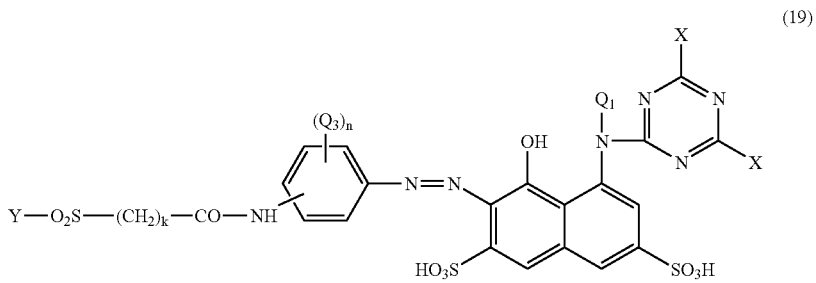

is obtained, and reacting the compound of formula (19) with a compound of formula (13).

The diazotisation of the compounds of formula (17) is effected in customary manner, for example using a nitrite, e.g. an alkali metal nitrite, such as sodium nitrite, in a mineral acid medium, for example a hydrochloric-acid-containing medium, at temperatures of, for example, from −5 to 40° C., preferably from −5 to 10° C. and especially from 0 to 5° C.

The condensation reactions between the compounds of formulae (12), (13) and (14) are generally effected analogously to known methods, such as those described, for example, in U.S. Pat. No. 4,841,049, usually in aqueous solution at temperatures of, for example, from 0 to 50° C. and at a pH value of, for example, from 2 to 10.

The halogen atom X on the triazine can be replaced by condensing the compound of formula (1) obtained wherein X is halogen, preferably fluorine or chlorine, with a compound X*—H wherein X* has the meanings given above for X except for halogen.

The compounds of formulae (12), (13) and (15) are known or can be obtained in a manner known per se.

Compounds of formula (17) are also known and are described, for example, in GB-A-1 155 149.

The end product may optionally be subjected to a further transformation reaction. In such a transformation reaction, for example, a group Y capable of being vinylated or a group, contained in A, capable of being vinylated is converted into its vinyl form by treatment with dilute sodium hydroxide solution, e.g. conversion of the β-sulfatoethylsulfonyl or β-chloroethylsulfonyl group into the vinylsulfonyl radical. Such reactions are known per se.

The reactive dyes according to the invention are present either in the form of their free acid or, preferably, in the form of their salts. Suitable salts are, for example, alkali metal, alkaline earth metal or ammonium salts or salts of an organic amine. Examples that may be mentioned are sodium, lithium, potassium or ammonium salts or a mono-, di- or tri-ethanolamine salt.

The reactive dyes according to the invention are suitable for dyeing and printing a wide variety of materials, especially hydroxyl-group-containing or nitrogen-containing fibre materials. Examples include paper, silk, leather, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes according to the invention are also suitable for dyeing or printing hydroxyl-group-containing fibres present in blend fabrics, for example blends of cotton and polyester fibres or polyamide fibres.

The present invention accordingly relates also to the use of reactive dyes of formula (1) in the dyeing or printing of hydroxyl-group-containing or nitrogen-containing, especially cotton-containing, fibre materials.

The reactive dyes according to the invention can be applied to the fibre material and fixed to the fibre in a variety of ways, especially in the form of aqueous dye solutions or dye print pastes. They are suitable both for the exhaust process and for dyeing in accordance with the pad-dyeing process; they can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The reactive dyes according to the invention are also suitable for printing, especially on cotton, and also for printing nitrogen-containing fibres, for example wool or silk or blend fabrics that contain wool.

The dyeings and prints produced using the reactive dyes according to the invention have a high tinctorial strength and a high fibre-dye binding stability in both the acidic and the alkaline range, and also good fastness to light and very good wet-fastness properties, such as fastness to washing, to water, to seawater, to cross-dyeing and to perspiration. The dyeings obtained exhibit fibre levelness and surface levelness.

The present invention relates also to aqueous inks which comprise a reactive dye of formula (1), wherein A, $Q_1$, $Q_2$, $Q_3$, X, Y, k, m and n have the definitions and preferred meanings given above.

The dyes used in the inks should preferably have a low salt content, that is to say should have a total salt content of less than 0.5% by weight, based on the weight of the dyes. Dyes which, as a result of their preparation and/or the subsequent addition of diluents, have higher salt contents can be desalted, for example, by membrane separation processes, such as ultrafiltration, reverse osmosis or dialysis.

The inks preferably have a total dye content of from 1 to 35% by weight, especially from 1 to 30% by weight and more especially from 1 to 20% by weight, based on the total weight of the ink. The preferred lower limit is 1.5% by weight, especially 2% by weight, more especially 3% by weight.

The inks may comprise water-miscible organic solvents, for example $C_1$–$C_4$alcohols, for example methanol, ethanol, n-propanol, isopropanol, n-butanol, sec-butanol, tert-butanol or isobutanol; amides, for example dimethylformamide or dimethylacetamide; ketones or ketone alcohols, for example acetone, diacetone alcohol; ethers, for example tetrahydrofuran or dioxane; nitrogen-containing heterocyclic compounds, for example N-methyl-2-pyrrolidone or 1,3-dimethyl-2-imidazolidone; polyalkylene glycols, for example polyethylene glycol or polypropylene glycol; $C_2$–$C_6$alkylene glycols and thioglycols, for example ethylene glycol, propylene glycol, butylene glycol, triethylene glycol, thiodiglycol, hexylene glycol and diethylene glycol; other polyols, for example glycerol or 1,2,6-hexanetriol; and $C_1$–$C_4$alkyl ethers of polyhydric alcohols, for example 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or, especially, 1,2-propylene glycol, usually in an amount of from 2 to 30% by weight, preferably from 5 to 30% by weight and especially from 10 to 25% by weight, based on the total weight of the ink.

The inks may also comprise solubilisers, for example ε-caprolactam.

The inks may comprise thickening agents of natural or synthetic origin, inter alia for the purpose of adjusting the viscosity.

Examples of thickening agents which may be mentioned are commercially available alginate thickeners, starch ethers or locust bean gum ethers, especially sodium alginate on its own or in admixture with a modified cellulose, for example methyl-, ethyl-, carboxymethyl-, hydroxyethyl-, methylhydroxyethyl-, hydroxypropyl- or hydroxypropylmethyl-cellulose, especially with preferably from 20 to 25% by weight carboxymethylcellulose. There may be mentioned as synthetic thickening agents also, for example, those based on poly(meth)acrylic acids or poly(meth)acrylamides.

The inks comprise such thickening agents, for example, in an amount of from 0.01 to 2% by weight, especially from 0.01 to 1% by weight and preferably from 0.01 to 0.5% by weight, based on the total weight of the ink.

The inks may also comprise buffer substances, for example borax, borates, phosphates, polyphosphates or citrates. Examples which may be mentioned include borax, sodium borate, sodium tetraborate, sodium dihydrogen phosphate, disodium hydrogen phosphate, sodium tripolyphosphate, sodium pentapolyphosphate, as well as sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

The inks may comprise surfactants or humectants as further additives.

There come into consideration as surfactants commercially available anionic or non-ionic surfactants. In the inks according to the invention, there come into consideration as humectants, for example, urea or a mixture of sodium lactate (advantageously in the form of a 50 to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and preferably from 1 to 10 mPa·s.

The inks may also comprise further conventional additives, for example antifoam agents or, especially, substances inhibiting fungal and/or bacterial growth. Such substances are usually used in amounts of from 0.01 to 1% by weight, based on the total weight of the ink.

The inks can be prepared in a conventional manner by mixing the individual constituents in the desired amount of water.

The inks according to the invention are suitable especially for use in recording systems in which the ink is expressed in the form of droplets from a small aperture and is directed towards a substrate on which an image is produced. Suitable substrates are, for example, paper, textile fibre materials or plastics films. Suitable recording systems are, for example, commercially available inkjet printers for use in the printing of paper or textiles, or writing implements such as fountain pens or ball-point pens, and especially inkjet printers.

Depending on the nature of its use, it may be necessary for e.g. the viscosity or other physical properties of the ink, especially those properties affecting the affinity to the substrate in question, to be modified as appropriate.

As examples of paper that can be printed with the inks according to the invention there may be mentioned commercially available inkjet paper, photo paper, glossy paper, plastics-coated paper, for example Epson inkjet paper, Epson photo paper, Epson glossy paper, Epson glossy film, HP special inkjet paper, Encad photo gloss paper and liford photo paper. Plastics films that can be printed with the inks according to the invention are, for example, transparent or milky/opaque. Suitable plastics films are, for example, 3M transparency film.

As textile fibre materials there come into consideration, for example, nitrogen-containing or hydroxy-group-containing fibre materials, e.g. textile fibre material of cellulose, silk, wool or synthetic polyamides, especially cellulose.

The present invention accordingly relates also to a method of printing textile fibre materials, paper or plastics films, preferably textile fibre materials or paper and especially textile fibre materials, by the inkjet printing method, which comprises using an aqueous ink comprising a reactive dye of formula (1), wherein A, $Q_1$, $Q_2$, $Q_3$, X, Y, k, m and n have the definitions and preferred meanings given above.

In the inkjet printing method, individual droplets of the ink are sprayed onto a substrate in a controlled manner from a nozzle. For this purpose, predominantly the continuous inkjet method and the drop-on-demand method are used. In the continuous inkjet method, the droplets are produced continuously and any droplets not required for the printing are conveyed to a collecting vessel and recycled, whereas in the drop-on-demand method droplets are produced and printed as required; that is to say, droplets are produced only when required for the printing. The production of the droplets can be effected, for example, by means of a piezo-inkjet head or by means of thermal energy (bubble jet). For the method according to the invention, printing by means of a piezo-inkjet head is preferred. Also preferred for the method according to the invention is printing in accordance with the continuous inkjet method.

The recordings, e.g. prints, that are produced are distinguished especially by high tinctorial strength and brilliance of colour and also by good light-fastness and wet-fastness properties.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to liters.

EXAMPLE 1 a) 25.6 parts of 1,3-phenylenediamine-4-sulfonic acid are dissolved in 200 parts of water at neutral pH and 4.6 parts of sodium acetate are added. To the resulting solution there are added, at 10° C. and with vigorous stirring, 31 parts of γ-(β-chloroethylsulfonyl)butyryl chloride, the pH of the reaction mixture being maintained at 5 by the simultaneous addition of aqueous sodium hydroxide solution. The pH of the reaction mixture is then adjusted to 1.8 and the precipitate obtained is filtered off and dried, yielding 38.5 parts of an amine of formula

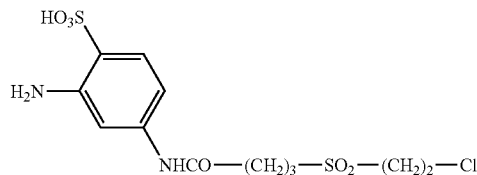

b) The amine obtained according to a) is dissolved in 400 parts of water at neutral pH and 25 parts of a 4N sodium nitrite solution are added. The solution obtained is added dropwise, at 0 to 3° C., to a mixture of ice and 25 parts of concentrated hydrochloric acid. Stirring is carried out for 1 hour at that temperature.

c) 19 parts of cyanuric chloride are dispersed in 75 parts of ice and 75 parts of water, with addition of a wetting agent.

To the resulting dispersion there is added a neutral solution of 31.9 parts of 1-amino-8-naphthol-3,6-disulfonic acid in 350 parts of water. After a few hours, the pH of the reaction mixture is adjusted to a value from 4 to 5.5 by addition of aqueous sodium hydroxide solution.

d) The diazo compound obtained according to b) is coupled, at a pH from 2 to 5.5 and a temperature from 0 to 5° C., to the condensation product contained in the reaction mixture according to c).

e) To the solution obtained according to d) there are added, in portions and at 10° C., 51.9 parts of the azo dye of formula

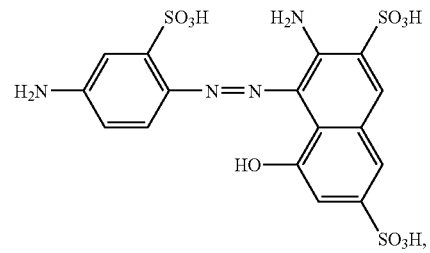

the pH of the reaction mixture being maintained at 4 by the simultaneous addition of aqueous sodium hydroxide solution. After about one hour, the pH of the reaction mixture is adjusted to 5 by the successive addition of aqueous sodium hydroxide solution. The reaction mixture is heated to 50° C. and stirred until the reaction is complete. The resulting solution is then clarified by filtration, freed of the salt by dialysis and freeze-dried. There are obtained 140 parts of a compound which in the form of the free acid corresponds to formula

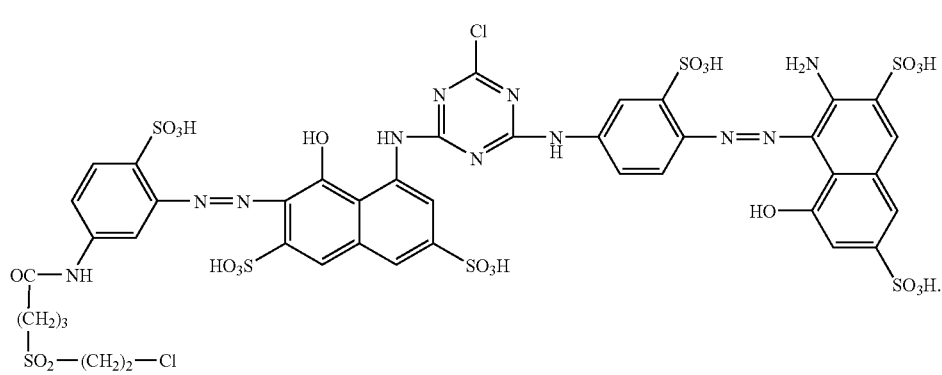

(101)

By treating the β-chloroethylsulfonyl form of formula (101) in dilute NaOH at pH 10 to 12, the vinylsulfonyl form is obtained, which in the form of the free acid corresponds to formula

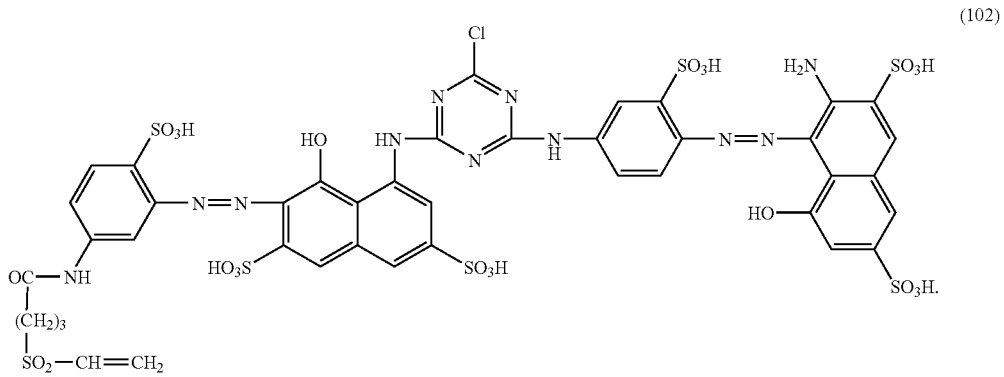
(102)

The dyes of formulae (101) and (102) dye cotton and wool a red shade with good all-round fastness properties.

EXAMPLES 2 TO 38

By proceeding as described in Example 1 but using, instead of the azo dye according to Example 1e), an equimolar amount of a dye of formula $A_x$-$NH_2$, there is obtained, in each case, a compound which in the form of the free acid corresponds to formula

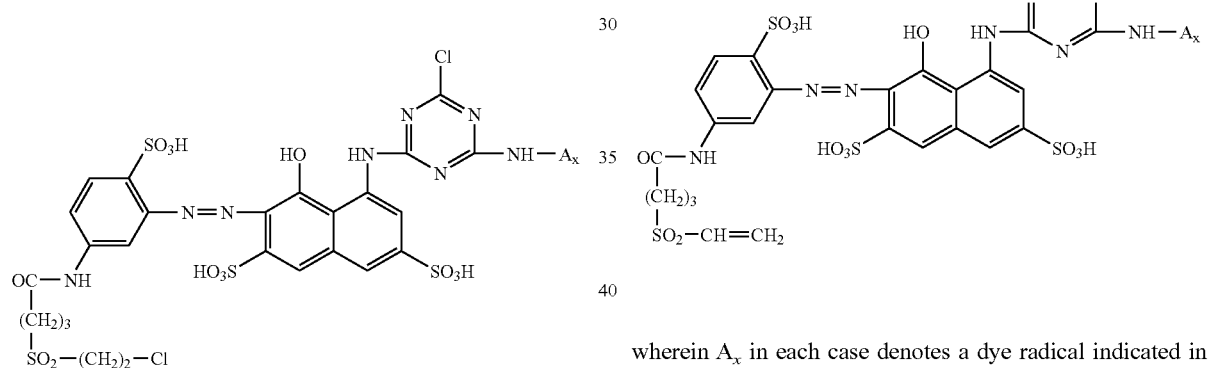

wherein $A_x$ in each case denotes a dye radical indicated in Table 1. By treating the β-chloroethylsulfonyl form in dilute NaOH at pH 10 to 12, the vinylsulfonyl form is obtained, which in the form of the free acid corresponds to formula wherein $A_x$ in each case denotes a dye radical indicated in Table 1. The dyes dye cotton and wool the shades indicated in each case with good all-round fastness properties.

TABLE 1

| Ex. | $A_x$ | Shade |
|---|---|---|
| 2 | ![structure] | red |

TABLE 1-continued

| Ex. | $A_x$ | Shade |
|---|---|---|
| 3 | 2-sulfo-5-methylphenyl-azo-[4-methyl-3-(methylsulfonic acid)-6-hydroxy-1-ethyl-2-oxo-pyridine] | orange |
| 4 | 2,4-disulfo-5-methylphenyl-azo-[4-methyl-3-carboxamido-6-hydroxy-1-ethyl-2-oxo-pyridine] | orange |
| 5 | 2-sulfo-5-methylphenyl-azo-[5-hydroxy-1-(4-sulfophenyl)-3-carboxy-pyrazole] | orange |
| 6 | 2-sulfo-5-methylphenyl-azo-[5-hydroxy-1-(2,5-dichloro-4-sulfophenyl)-3-methyl-pyrazole] | orange |
| 7 | 2-sulfo-5-methylphenyl-azo-[5-hydroxy-1-(2-methyl-5-sulfophenyl)-3-methyl-pyrazole] | orange |
| 8 | 2-acetamido-4-methylphenyl-azo-[1,5-disulfo-naphthalene] | orange |
| 9 | 2-ureido-4-methylphenyl-azo-[3,5,7-trisulfo-naphthalene] | orange |

TABLE 1-continued

| Ex. | $A_x$ | Shade |
|---|---|---|
| 10 | 4-methyl-2-(ureido)phenyl-azo-(2,4-disulfo)phenyl | orange |
| 11 | (2,4-disulfo-5-methyl)phenyl-azo-(1-ethyl-3-sulfomethyl-4-methyl-6-hydroxy-pyridin-2-one) | orange |
| 12 | 4-methyl-2-(ureido)phenyl-azo-(2,5-dimethyl)phenyl-azo-(2,5-disulfo)phenyl | orange |
| 13 | 4-methyl-2-(acetylamino)phenyl-azo-(6,8-disulfo)naphth-2-yl | orange |
| 14 | 4-methylphenyl-azo-(2-methyl)phenyl-azo-(5-hydroxy-6,8-disulfo)naphth-2-yl | red |
| 15 | (2-sulfo-5-methyl)phenyl-azo-(1-hydroxy-8-propionylamino-3,6-disulfo)naphth-2-yl | red |
| 16 | (2-sulfo-5-methyl)phenyl-azo-(1-hydroxy-8-acetylamino-3,6-disulfo)naphth-2-yl | red |
| 17 | (2-sulfo-5-methyl)phenyl-azo-(1-hydroxy-8-benzoylamino-3,6-disulfo)naphth-2-yl | red |

TABLE 1-continued

| Ex. $A_x$ | Shade |
|---|---|
| 18 | red |
| 19 | red |
| 20 | violet |
| 21 | violet |
| 22 | violet |

TABLE 1-continued
| Ex. $A_x$ | | Shade |
|---|---|---|
| 23 | 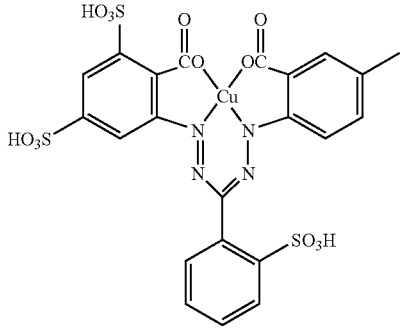 | violet |
| 24 | 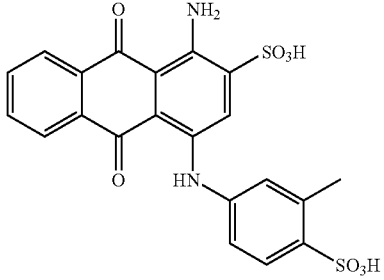 | violet |
| 25 | 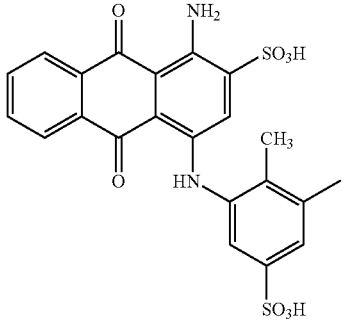 | violet |
| 26 | 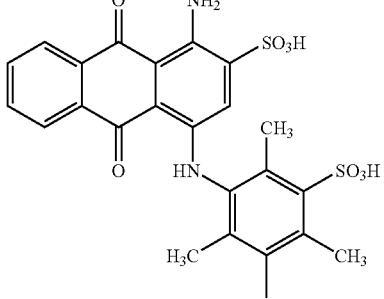 | violet |
| 27 | 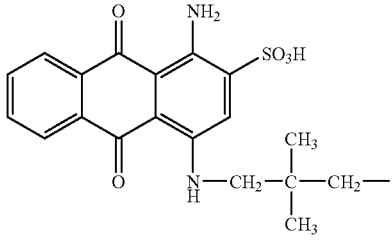 | violet |

TABLE 1-continued

| Ex. | A$_x$ | Shade |
|---|---|---|
| 28 | (structure) | red |
| 29 | (structure) | violet |
| 30 | (structure) | violet |
| 31 | (structure) | violet |
| 32 | (structure) | violet |
| 33 | (structure) | violet |

TABLE 1-continued
| Ex. | $A_x$ | Shade |
|---|---|---|
| 34 | 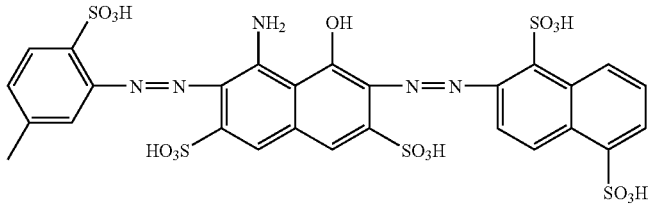 | violet |
| 35 | 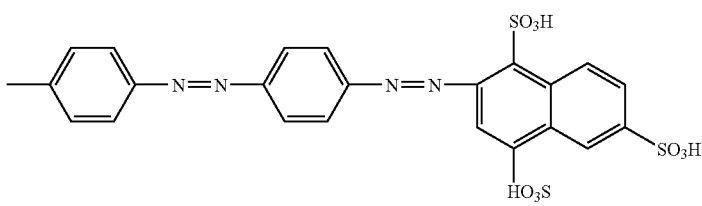 | red |
| 36 | 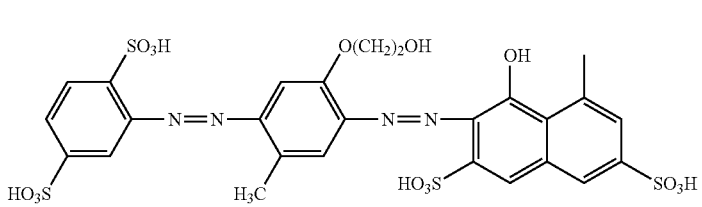 | red |
| 37 | | red |
| 38 | 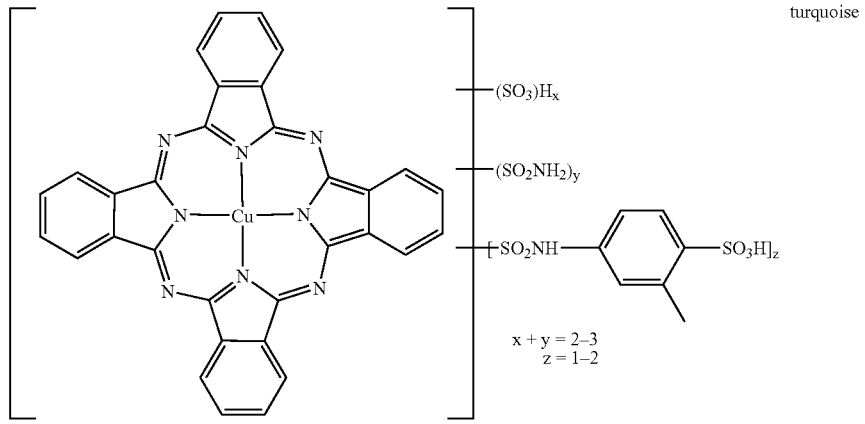 | turquoise |

EXAMPLES 39 TO 41

Also in analogy to the procedure described in Example 1 it is possible to prepare the compounds which in the form of the free acid correspond to formulae (103), (104) and (105) and dye cotton and wool the shades indicated with good all-round fastness properties.

Dyeing is continued at that temperature for a further 45 minutes. The dyed goods are then rinsed, soaped at the boil for a quarter of an hour with a non-ionic detergent, rinsed again and dried.

As an alternative to that procedure, dyeing can be carried out at 80° C. instead of at 60° C.

| | | Shade |
|---|---|---|
| 39 | [structure (103)] | red |
| 40 | [structure (104)] | red |
| 41 | [structure (105)] | red |

Dyeing Procedure I 100 parts of cotton fabric are placed at 60° C. in 1500 parts of a dyebath containing 45 g/l of sodium chloride and 2 parts of the reactive dye obtained according to Example 1. After 45 minutes at 60° C., 20 g/l of calcined soda are added.

Dyeing Procedure II 0.1 part of the dye according to Example 1 is dissolved in 200 parts of water, and 0.5 part of sodium sulfate, 0.1 part of a levelling agent (based on the condensation product of a higher aliphatic amine and ethylene oxide) and 0.5 part of sodium acetate are added. The pH is then adjusted to a value of 5.5 with acetic acid (80%). The dyebath is heated at 50° C. for 10 minutes and then 10 parts of a woollen fabric are added. The dyebath is heated to a temperature of 100° C. in the course of about 50 minutes and dyeing is carried out at that temperature for 60 minutes. The dyebath is then cooled to 90° C. and the dyed goods are removed. The woollen fabric is washed with hot and cold water, then spun and dried.

Printing Procedure

While stirring rapidly, 3 parts of the dye obtained according to Example 1 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, if desired soaped at the boil and again rinsed, and then dried.

What is claimed is:

1. A reactive dye of formula

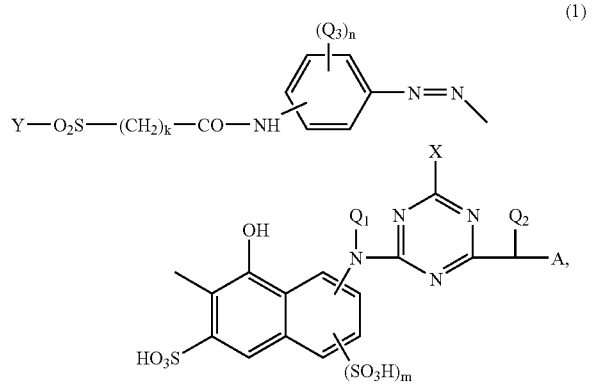

(1)

wherein
- A is the radical of a monoazo, polyazo, metal complex azo, anthraquinone, phthalocyanine, formazan or dioxazine chromophore,
- $Q_1$ and $Q_2$ are each independently of the other hydrogen or unsubstituted or substituted $C_1$–$C_4$alkyl, $(Q_3)_n$ denotes n substituents selected from the group consisting of $C_1$–$C_4$alkyl, $C_1$–$C_4$alkoxy, halogen and sulfo,
- X is halogen, 3-carboxypyridin-1-yl, 3-carbamoylpyridin-1-yl, hydroxy, $C_1$–$C_4$alkoxy unsubstituted or substituted in the alkyl moiety, phenoxy unsubstituted or substituted in the phenyl moiety,
- $C_1$–$C_4$alkylthio unsubstituted or substituted in the alkyl moiety, unsubstituted or substituted amino, or an N-heterocycle which may or may not contain further hetero atoms,
- Y is vinyl or a radical —$CH_2$—$CH_2$—U and U is a group removable under alkaline conditions,
- k is a number 2, 3, 4, 5 or 6,
- m is a number 0 or 1, and
- n is a number 0, 1 or 2, with the proviso that when A denotes a monoazo chromophore it is not directly linked to the triazinyl radical through a hydroxynaphthalenesulfonic acid coupling component and does not denote a radical of formula

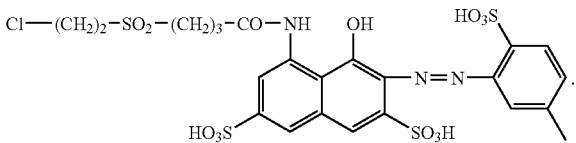

2. A reactive dye according to claim 1, wherein $Q_1$ and $Q_2$ are hydrogen.

3. A reactive dye according to claim 1, wherein X denotes fluorine or chlorine.

4. A reactive dye according to claim 1, wherein Y is —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$.

5. A reactive dye according to claim 1, wherein $Q_3$ is sulfo.

6. A reactive dye according to claim 1, wherein k is the number 3.

7. A reactive dye according to claim 1, wherein m is the number 1.

8. A reactive dye according to claim 1, wherein n is the number 1.

9. A reactive dye according to claim 1, wherein A is a mono- or dis-azo dye radical of formula

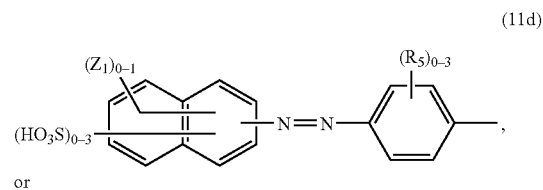

(11d)

or

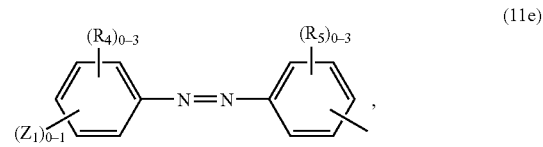

(11e)

wherein $(R_4)_{0-3}$ denotes from 0 to 3 identical or different substituents selected from the group consisting of $C_1$–$C_4$alkyl, $C_1$–$C_4$alkoxy, halogen, carboxy and sulfo, $(R_5)_{0-3}$ denotes from 0 to 3 identical or different substituents selected from the group consisting of halogen, nitro, cyano, trifluoromethyl, sulfamoyl, carbamoyl, $C_1$–$C_4$alkyl; $C_1$–$C_4$alkoxy unsubstituted or substituted by hydroxy, sulfato or $C_1$–$C_4$alkoxy; amino, $C_2$–$C_4$alkanoylamino, ureido, hydroxy, carboxy, sulfomethyl, $C_1$–$C_4$alkylsulfonylamino and sulfo, and $Z_1$ denotes a radical of formula —$SO_2$—Y (2a), —$CONR_2$—$(CH_2)_l$—$SO_2$—Y (2c), —NH—CO—CH(Hal)-$CH_2$-Hal (2d), —NH—CO—C(Hal)=$CH_2$ (2e) or

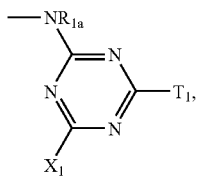 (2f)

wherein
Hal is chlorine or bromine,
$X_1$ is halogen, 3-carboxypyridin-1-yl or 3-carbamoylpyridin-1-yl,
$T_1$ has independently the same definitions as $X_1$, or is a non-fibre-reactive substituent or a fibre-reactive radical of formula

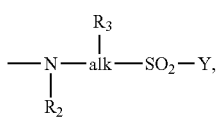 (3a)

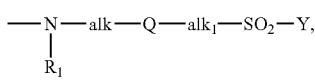 (3b)

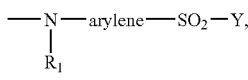 (3c)

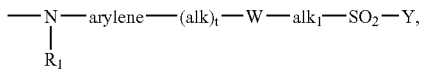 (3d)

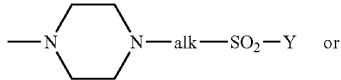 (3e)

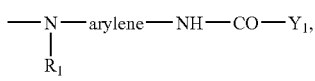 (3f)

wherein
$R_1$ and $R_{1a}$ are each independently of the other hydrogen or $C_1$–$C_4$alkyl,
$R_2$ is hydrogen, $C_1$–$C_4$alkyl unsubstituted or substituted by hydroxy, sulfo, sulfato, carboxy or cyano, or a radical

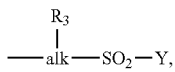

$R_3$ is hydrogen, hydroxy, sulfo, sulfato, carboxy, cyano, halogen, $C_1$–$C_4$alkoxycarbonyl, $C_1$–$C_4$alkanoyloxy, carbamoyl or a group —SO$_2$—Y,
alk and alk$_1$ are each independently of the other linear or branched $C_1$–$C_6$alkylene,
arylene is a phenylene or naphthylene radical unsubstituted or substituted by sulfo, carboxy, $C_1$–$C_4$alkyl, $C_1$–$C_4$alkoxy or halogen,
Q is a radical —O— or —NR$_1$— wherein $R_1$ is as defined above,
W is a group —SO$_2$—NR$_2$—, —CONR$_2$— or —NR$_2$CO— wherein $R_2$ is as defined above, Y is vinyl or a radical —CH$_2$—CH$_2$—U and U is a group removable under alkaline conditions,
$Y_1$ is a group —CH(Hal)-CH$_2$-Hal or —C(Hal)=CH$_2$, Hal being as defined above, and
I is an integer from 1 to 6 and t is a number 0 or 1,

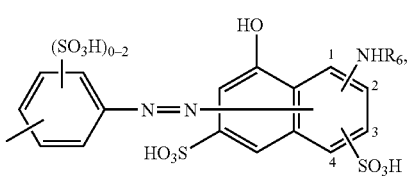 (11f)

or

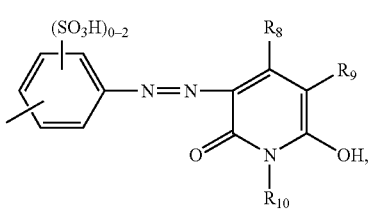 (11g)

wherein $R_6$ is hydrogen, $C_1$–$C_4$alkyl, sulfophenyl, $C_2$–$C_4$alkanoyl, benzoyl or a radical of formula (2f) given above,

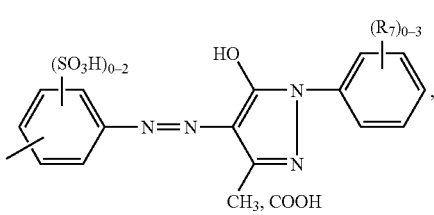 (11i)

or

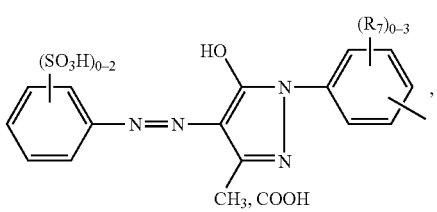 (11j)

wherein $(R_7)_{0-3}$ denotes from 0 to 3 identical or different substituents selected from the group consisting of $C_1$–$C_4$alkyl, $C_1$–$C_4$alkoxy, halogen, carboxy and sulfo,

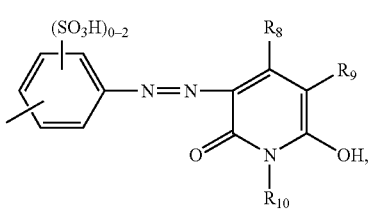 (11k)

wherein $R_8$ and $R_{10}$ are each independently of the other hydrogen, $C_1$–$C_4$alkyl or phenyl, and $R_9$ is hydrogen, cyano, carbamoyl or sulfomethyl,

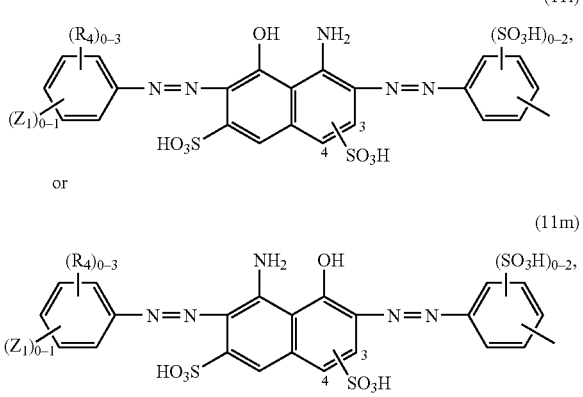

or

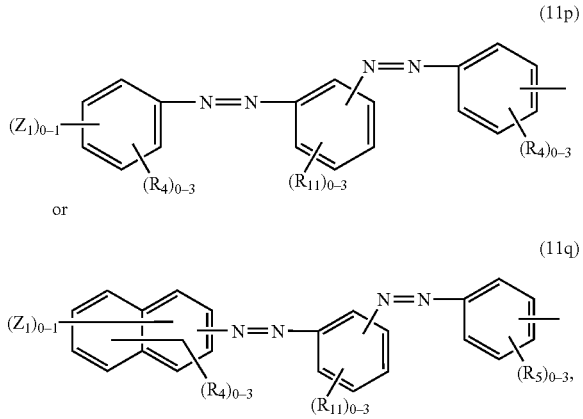

wherein $(R_4)_{0-3}$ and $Z_1$ each have the definitions given above,

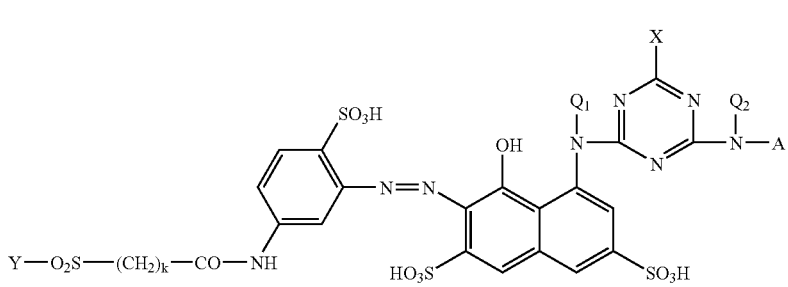

wherein $(R_4)_{0-3}$ and $(R_5)_{0-3}$ each have the definitions given above, and $(R_{11})_{0-3}$ denotes from 0 to 3 identical or different substituents selected from the group consisting of $C_1$–$C_4$alkyl, $C_1$–$C_4$alkoxy, halogen, carboxy and sulfo, and $Z_1$ has the definitions given above.

10. A reactive dye, according to claim 9, of formula

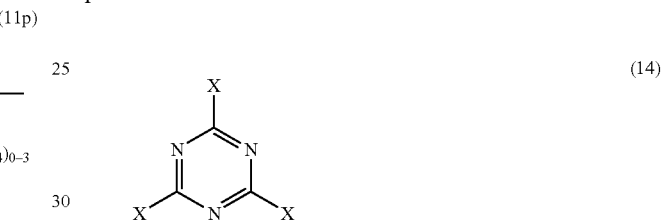

wherein
Q$_1$ and Q$_2$ are hydrogen,
A is a mono- or dis-azo dye radical of formula (11d), (11e), (11f), (11g), (11i), (11j), (11k), (11l), (11m), (11p) or (11q) according to claim 9,
X is fluorine or chlorine,
Y is vinyl, β-chloroethyl or β-sulfatoethyl, preferably vinyl or β-chloroethyl, and k is a number 2 or 3.

11. A process for the preparation of a reactive dye according to claim 1, wherein approximately one molar equivalent of a compound of formula

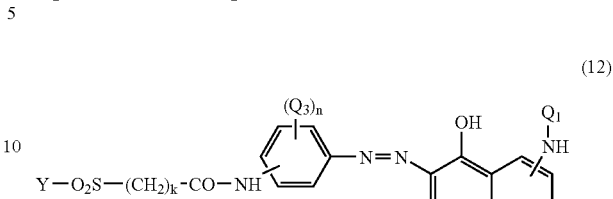

approximately one molar equivalent of a compound of formula $$A\text{-NHQ}_2 \qquad (13),$$

or suitable precursors of the compounds of formula (12) or (13), and approximately one molar equivalent of a compound of formula

are reacted with one another step-wise, in any order, or, if using precursors of compounds of formula (12) or (13), the intermediates obtained are converted into the desired dyes and, where appropriate, a further transformation reaction is subsequently carried out, A, Q$_1$, Q$_2$, Q$_3$, Y, k, m and n in each case having the definitions given in claim 1 and X being halogen.

12. A method of dyeing or printing of hydroxyl-group-containing or nitrogen-containing fibre materials, which comprises contacting said materials with a tinctorially effective amount of a reactive dye according to claim 1.

13. A method according to claim 12, wherein cellulosic fibre materials are dyed or printed.

14. An aqueous ink comprising a reactive dye of formula (1) according to claim 1.

15. A method of printing textile fibre materials, paper or plastics films by the inkjet printing method, which comprises printing said materials with an aqueous ink according to claim 14.

* * * * *